Patented Aug. 22, 1944

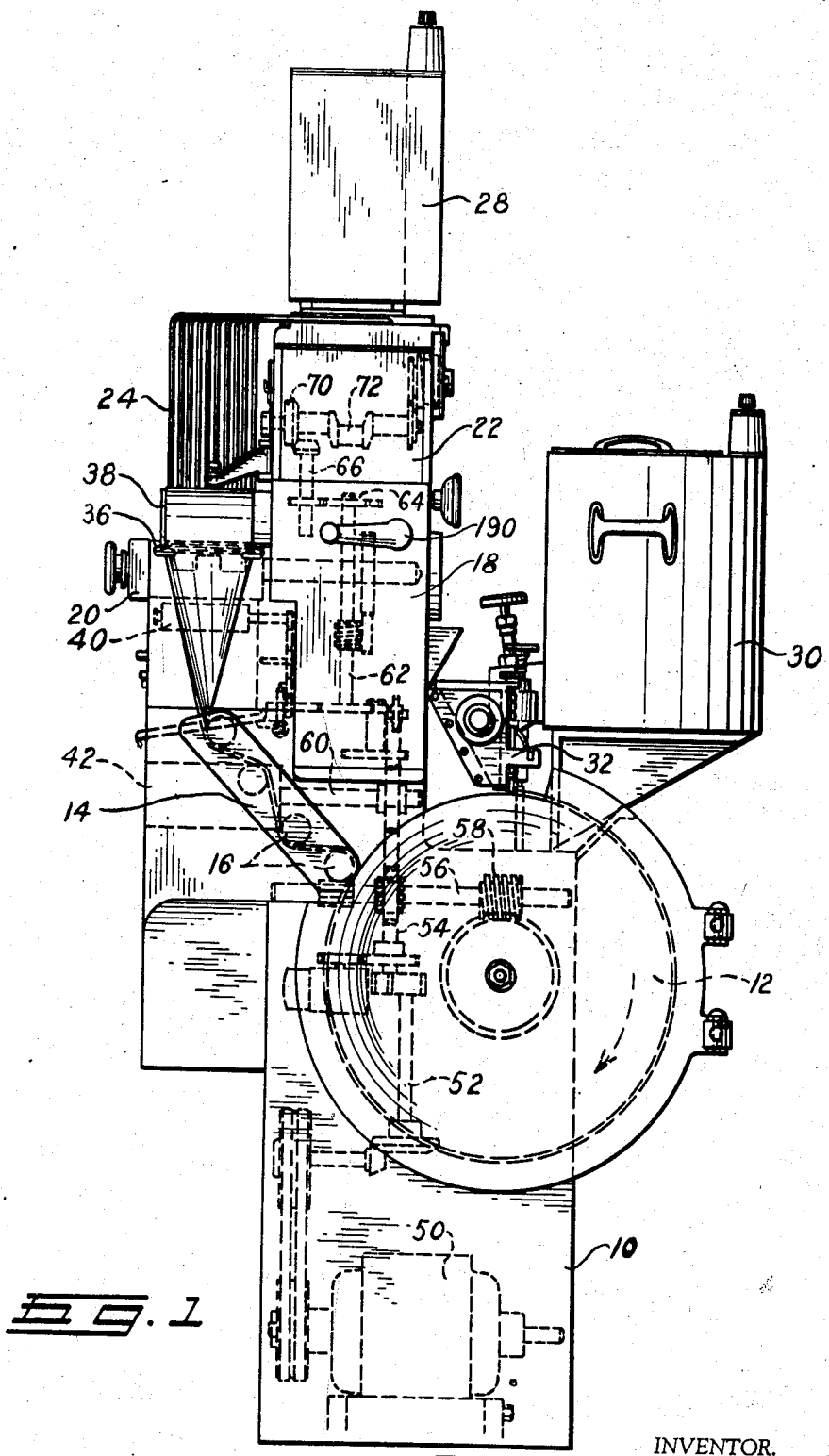

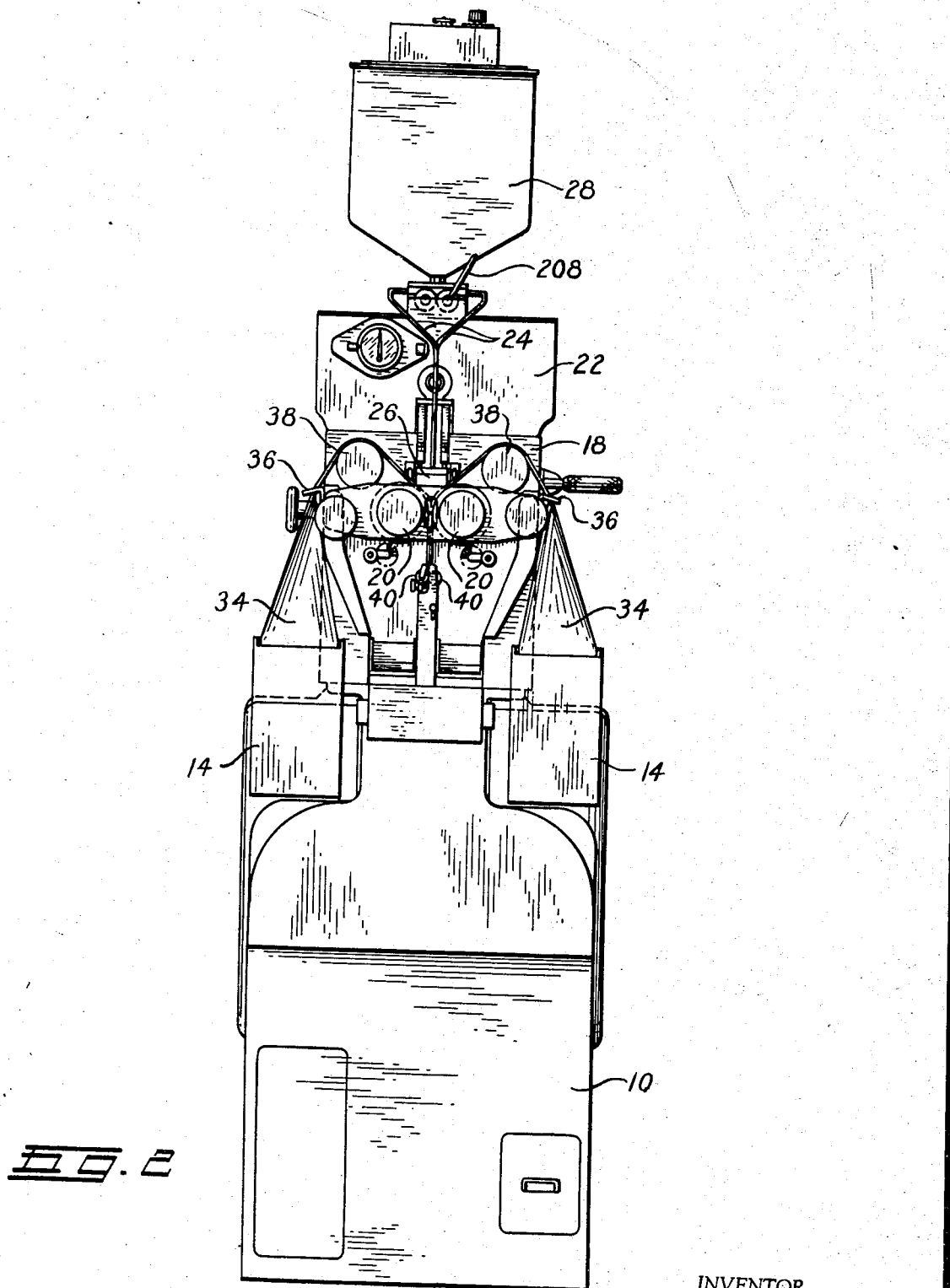

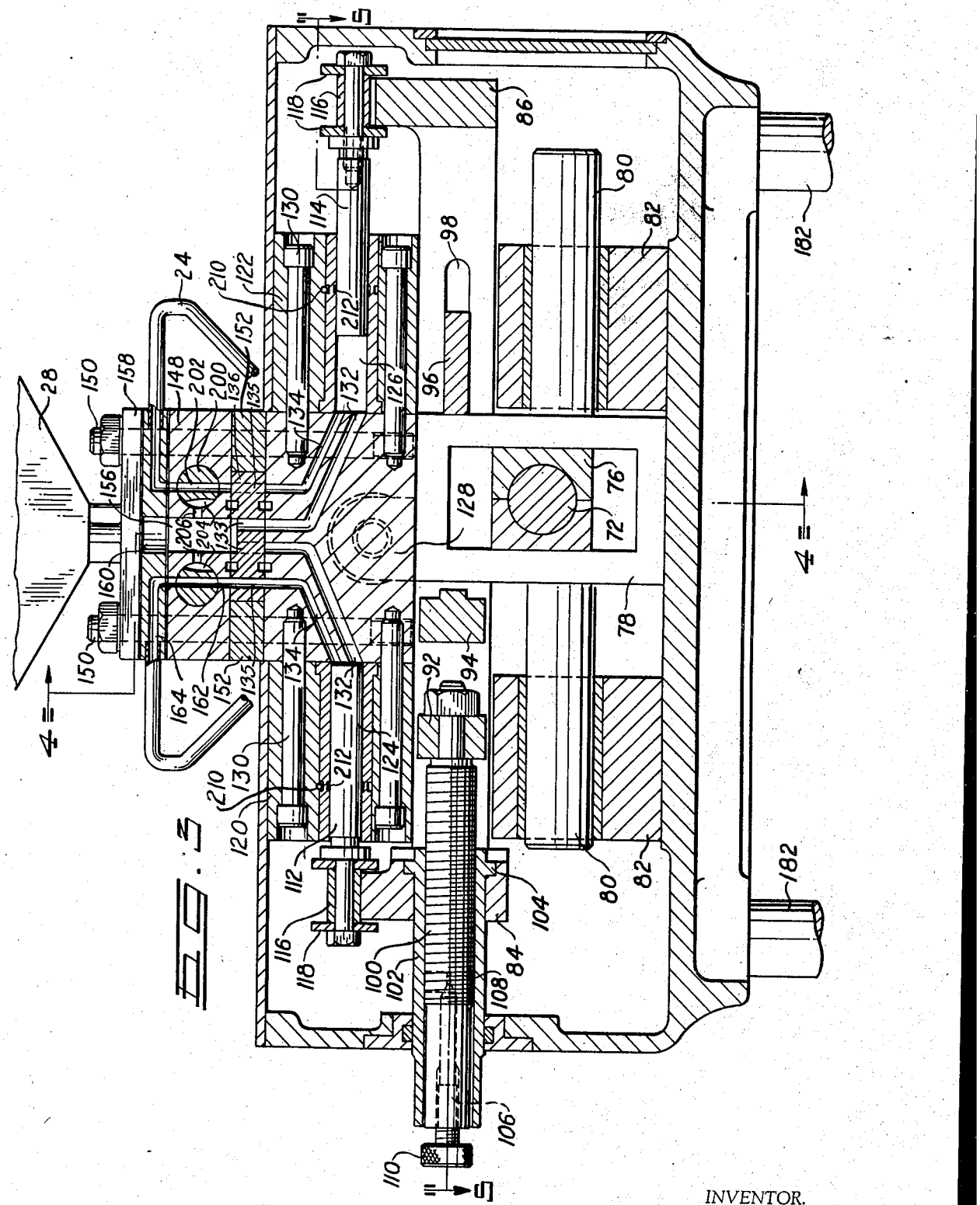

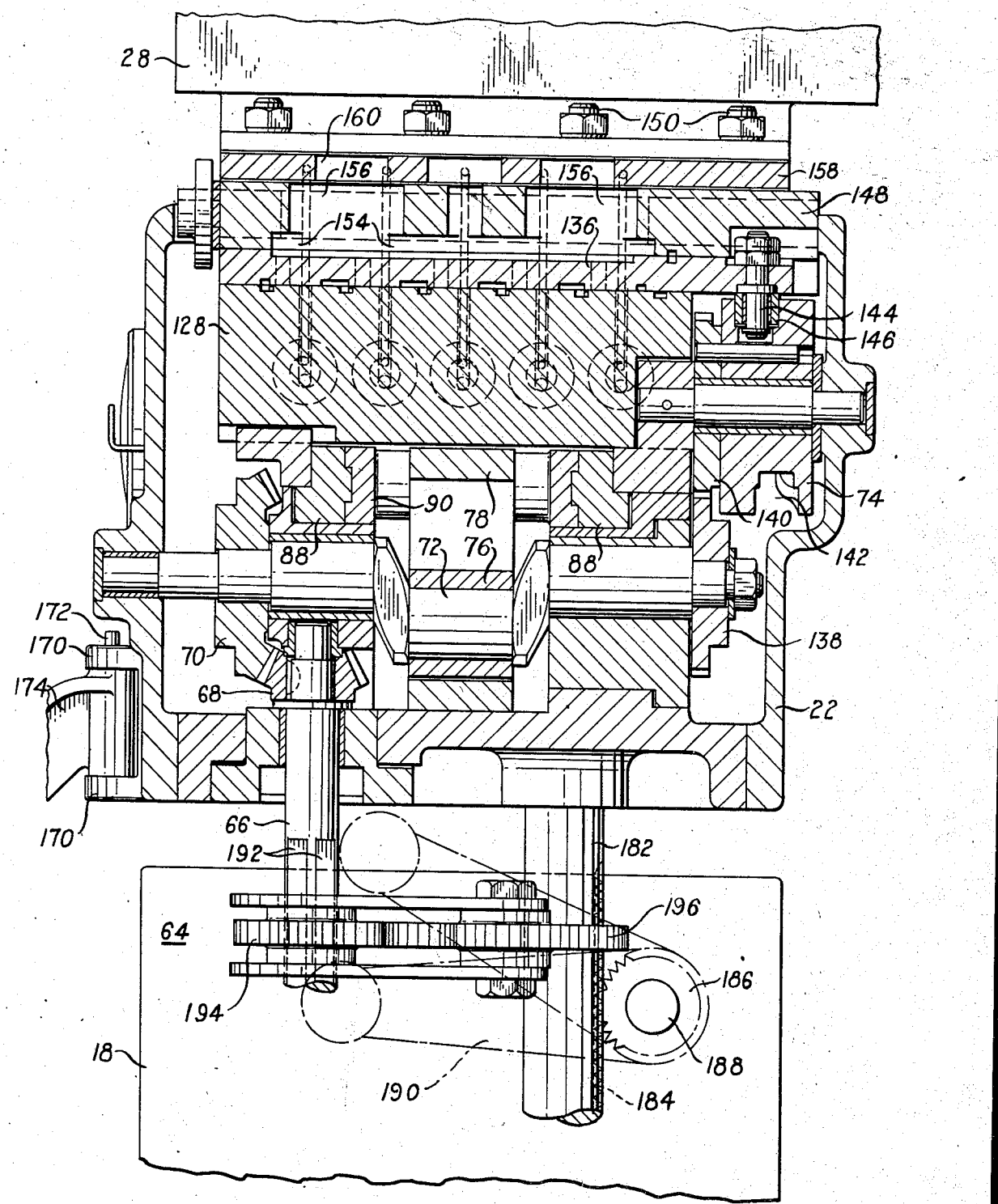

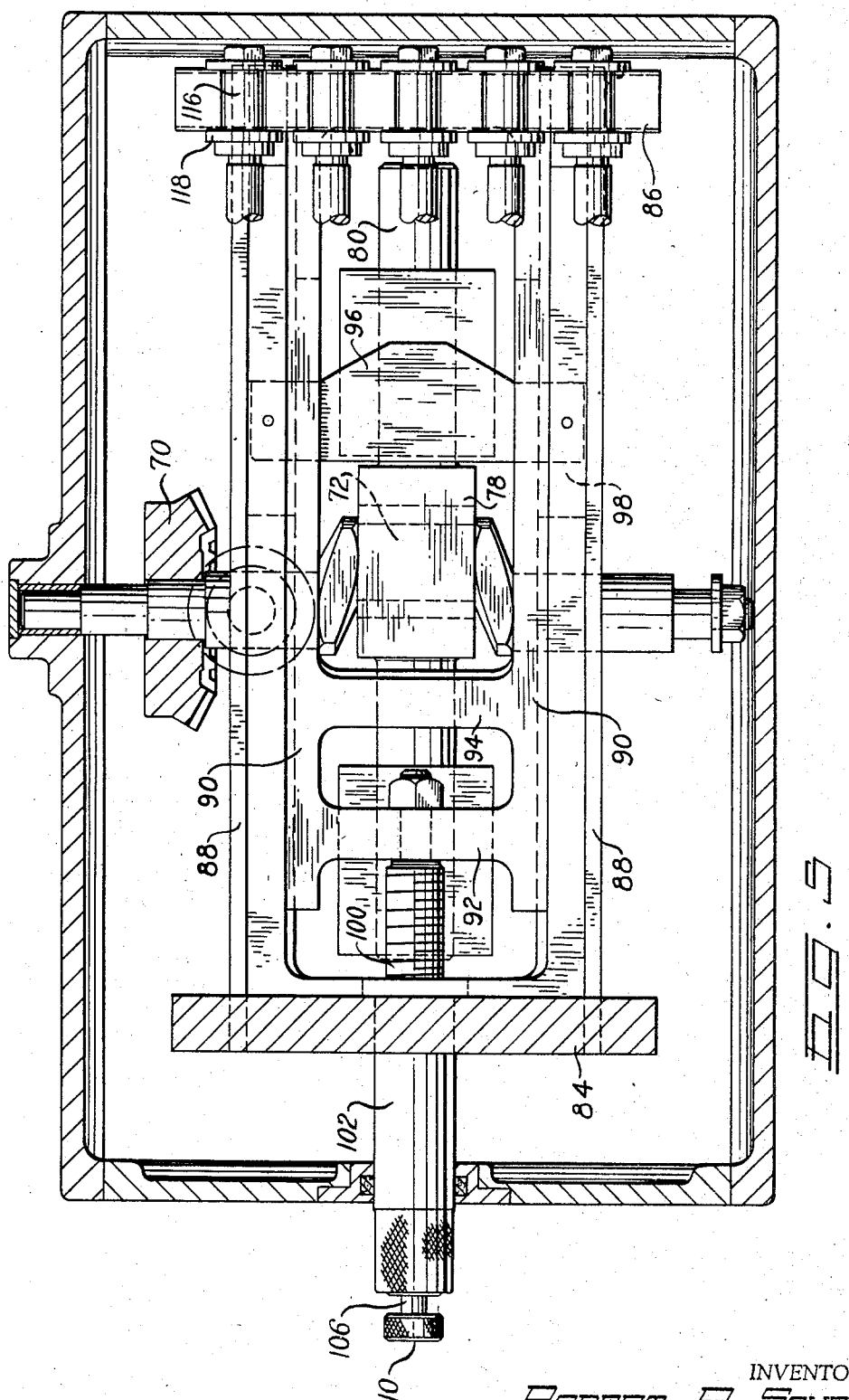

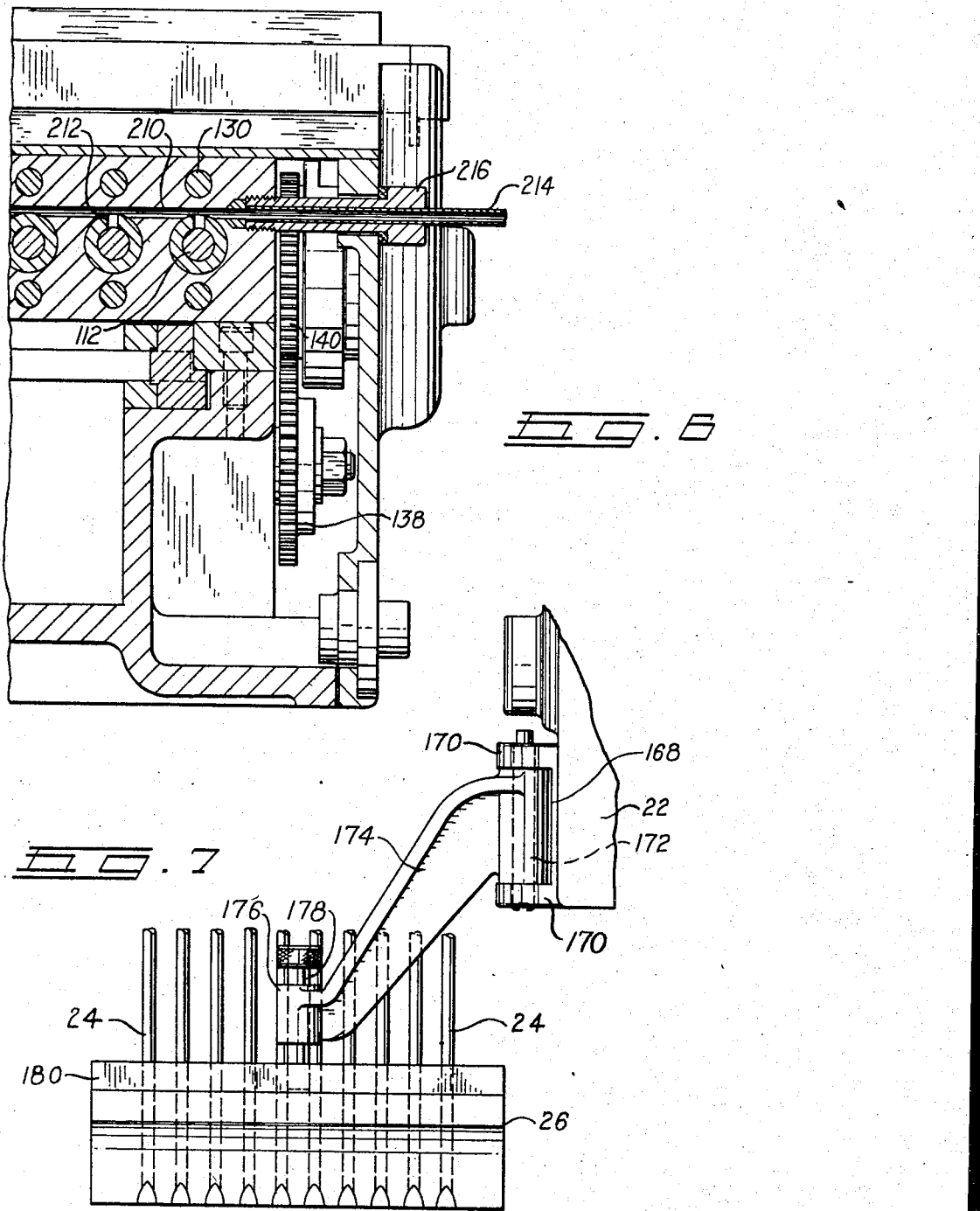

2,356,436

UNITED STATES PATENT OFFICE 2,356,436

CAPSULATING MACHINE

Robert P. Scherer, Detroit, Mich., assignor, by mesne assignments, to Gelatin Products Corporation, Detroit, Mich., a corporation of Michigan Application June 24, 1940, Serial No. 341,986

10 Claims. (Cl. 103—172)

This invention relates to the fluid filled sealed capsules and particularly to improvements in machines for manufacturing capsules of this character.

In my copending application, Serial No. 336,-110, filed May 20, 1940, I have described in general a capsulating machine composed of a number of units all operatively associated together in a compact apparatus, and particularly have described and claimed the unit for mounting and operating the die rolls used to form the capsules. The present invention relates to a part or unit of the machine and particularly to that part of the apparatus which measures and delivers under pressure the filler material which is capsulated.

An important object of this invention is to provide improvements in the apparatus for measuring and delivering filler material and especially improvements in the mechanism for pumping the filler material in accurately metered quantities to the feeder which injects the material into the capsules as they are formed. It is possible by virtue of this novel mechanism to regulate the quantity from very small quantities to very large quantities and to make the variations in quantity while the mechanism is functioning. An important feature of the mechanism is the positive "cut off" of filler material after an accurate measurement of filler material has been determined for one capsule.

Another important object of this invention is to provide a novel valve control member which is so shaped and constructed that it alone controls the admission and discharge of two or more sets of pumping devices. Another object is to provide novel operating mechanism for driving the pumping devices, including means for varying the pump stroke of the devices without stopping the operation.

Another important feature of a machine constructed in accordance with this invention is the ability to inspect and clean parts, and especially the feeder head, without interrupting the operation of the parts. This is accomplished by the provision of novel means for raising the feeder head from between the sheets or bands of capsule shell forming material while the moving parts of the machine are still functioning, and novel means for cutting off the delivery of capsule filler material to the feeder head while the pump mechanism is still operating. The machine, as previously described, is composed of a number of units operatively assembled together. The feeder head is floatingly attached to the unit containing the pumping mechanism and it is possible by virtue of the novel means referred to above to raise the pump unit and the feeder head therewith and expose the ejection parts of the feeder head for inspection and cleaning. Novel operating means is provided for continuing the operation of the parts even when the pump unit is raised relative to the machine.

Another important feature of the invention is the provision of a novel liquid or oil seal in the pumping devices which prevent the escape and waste of capsule filler material and insures accurate dosages. This is accomplished by the provision of novel means which delivers to the chamber of the pumping device a supply of oil which forms a seal between the chamber walls and the side of the piston reciprocating therein. An important feature is the fact that the oil is delivered and maintained at a pressure slightly greater than the pressure exerted by the piston on the filler content material in order to counteract any tendency of the filler material to escape.

Various other objects, advantages and meritorious features will more fully appear from the following description, appended claims, and accompanying drawings, wherein:

Fig. 1 is a side view of a machine embodying the invention showing the general assembly and in dotted outline certain operating parts, Fig. 2 is a front view of the machine in Fig. 1, Fig. 3 is a vertical transverse cross-sectional view through the pump unit of the machine showing the details of construction of the pumping mechanism for delivering metered dosages of capsulating material, Fig. 4 is a cross-sectional view of the pump unit along line 4—4 of Fig. 3 and also including a sectional view of a part of the apparatus in the die roll unit below, Fig. 5 is a horizontal sectional view through pump unit along line 5—5 of Fig. 3, Fig. 6 is a vertical sectional view through the rear end of the pump unit showing the manner of providing an oil seal to prevent leakage of capsulating material, and Fig. 7 is a side view of the feeder head and the manner of connecting the same to the pump unit.

As described in my copending application, Serial No. 336,110, the machine embodying the invention is composed of a plurality of separate units assembled and operatively connected together. These units are each interchangeable and like units can be substituted for one another for cleaning or repair purposes without any more than momentarily interrupting the operation of the machine.

Referring to Figs. 1 and 2, the machine comprises a base unit or column 10 supporting a pair of rotating casting drums 12—12, one on either side thereof. Supported on each side of the front part of the base unit 10 is a unit 14 carrying a series of oil rollers 16. These rollers project forwardly and upwardly from the peripheries of the drums. Superimposing the front section of the base unit is a unit 18 which carries a pair of forwardly projecting die rolls 20—20 and contains operating mechanism therein for driving the same. On top of this unit is the pump unit 22 to which this invention primarily relates. Extending from the pump unit are a plurality of tubes 24 which lead to a feeder head 26 having its wedge-shaped bottom edge entering between the two die rolls 20—20.

Above the pump unit is a vat 28 for containing capsule filler content material. The material in the vat flows into the pump chambers of the pump unit as will be later described. Above the rear section of the base unit is a vat 30 for containing the capsule shell forming material. This material flows into a spreader box 32 having an inclined front wall and an adjustable gate above each drum which allows a stream of this material to flow upon the periphery of each drum.

The drums rotate in the direction of the arrow in Fig. 1. The shell material spread on the periphery of the drums forms an integral sheet or band by the time it reaches the oil rollers 16. It is then taken off of the drums and conducted by the rollers 16 to a position in line with but below the die rolls 20—20. Each band of capsule forming material indicated at 34 is next passed through guide 36 and thence over a feed roll 38 superimposing one of the die rolls 20. From this point the two bands 34—34 converge and come together as they pass between the die rolls. The feeder head 26 rides upon the bands and discharges filler material between the bands as the cavities in the die rolls come opposite one another. After passing between the die rolls, stripper rolls 40—40 dislodge the filled capsules from the bands. The balance of the bands continue downwardly between mangle rolls 42—42 to a suitable receptacle.

The moving parts in the different units are driven from a single source of power by interconnecting shafts and gears. In the embodiment of the invention illustrated herein, an electric motor 50 constitutes the driving force. It is connected to a vertical column shaft 52 by belting and bevel gear assembly shown in Fig. 1. This shaft is connected by gearing to a second vertical column shaft 54. A horizontal column shaft 56 derives its power from worm gearing on shaft 54. The rear end of shaft 56 is provided with a worm gear 58 for driving the shaft upon which the two drums 12—12 are mounted. The front end of the shaft is likewise provided with a worm gear for driving the oil roll assembly 16. Shaft 54 also drives a horizontal shaft 60 which in turn drives the two mangle drums 42—42 referred to above.

Shaft 54 extends upwardly into the bottom end of the die roll unit 18 and there through interconnecting gearing described in my copending application it drives a vertical shaft 62. This shaft, as likewise described in my copending application, drives die rolls 20—20. In the upper part of unit 18 there is a variable speed change gear mechanism generally indicated at 64 which connects shaft 62 with a shaft 66. This last shaft extends upwardly into the pump unit 22 and carries on its upper end a bevel gear 68 driving a bevel gear 70 fixed to crank shaft 72. This last shaft drives the pumping devices for delivering metered quantities of filler material to the feeder head. Through a cam element 74 it also drives a valve control member which regulates the admission and discharge of the filler material into and from the pumping devices.

Referring to Figs. 3 to 7, the crank shaft 72 carries a square shaped bearing 76 fitting within a yoke 78 supported for reciprocating movement by the oppositely projecting arms 80—80 slidable in bearings 82—82. When operated, the yoke is adapted to reciprocate two frames 84 and 86 each carrying a set of pump pistons or plungers. As best shown in Fig. 5, the frames 84 and 86 are arranged to telescope upon one another, that is to say, frame 86 which is narrower in width than frame 84 is arranged to slide within the latter. Frame 84 comprises two side arms 88—88 longitudinally channeled on their inner sides to receive and guide the two side arms 90—90 of the smaller frame member 86. The latter is bridged by two cross members 92 and 94 formed integrally with the side arms. A cross member 96 forming a separate element is connected to the side arms 88—88 of the larger frame. The side arms 90—90 of the smaller frame are slotted longitudinally as at 98 in Fig. 3 to allow cross member 96 to pass therethrough. The slot is oversize the width of the member 96 so that the frames have a limited lengthwise movement relative to one another. The yoke 78 when it is reciprocated by the crank strikes first cross member 94 and then upon reversal the cross member 96.

The two frames 84 and 86 are adjustably secured together for joint reciprocation. This is accomplished by the provision of a threaded member 100 having its reduced inner end secured to cross member 92 as shown in Fig. 3. Member 100 is threaded to a surrounding sleeve 102 having a shoulder 104 abutting against the inside of the end of frame 84. It is obvious that through the threaded connection the two frames are coupled together for joint reciprocation. Both the sleeve 102 and member 100 project out through one of the side walls of the pump unit. The projecting end section of the sleeve 102 is knurled as shown in Fig. 5 to facilitate manual turning. It is obvious from the assembly of the parts relating to this feature that upon rotatable adjustment of the sleeve 102 the threaded member 100 will move longitudinally in one direction or the other depending upon the direction of rotation of the sleeve and either draw cross members 94 and 96 fastened to the frames 84 and 86 closer together or separate them. As will be described more particularly later, this adjustment will vary the stroke of the pumping devices which force capsule content material under pressure into the capsules being formed. To lock this assembly in any adjusted position, a smaller threaded member 106 extends axially through the larger member 100 and is provided with a tapered inner extremity which is adapted when advanced to radially expand or wedge a split section 108 of member 100. A knob 110 aids the operator in tightening the adjustment the desired amount.

As previously mentioned, two sets of pumping devices are operated within this pump unit.

The sets alternate in function so that while one is discharging metered quantities of filter material the other is being filled preparatory to ejection under pressure. The frames 84 and 86 each carry a set of pump pistons which operate in these pumping devices. Each piston set is secured to the outer end of its respective frame. A piston of the set carried by the frame 84 is shown at 112 in Fig. 3. A piston of the set carried by frame 86 is shown at 114 in Fig. 3 and also in Fig. 5. The upper surface of the outer ends of each frame is provided with a series of semi-circular recesses. The outer end of each piston 112 and 114 is provided with a spool 116 and two discs 118 to position it in the frame. It is obvious from the assembly that the pistons are held upon the frame for joint axial reciprocation. In the embodiment of the invention illustrated herein each frame carries five pistons, there being ten pumping devices in the whole unit.

Two metal blocks 120 and 122 superimpose the piston supporting frames, and are bored out to receive sleeves forming chambers 124 and 126 in which the pistons reciprocate. The blocks 120 and 122 are supported in any suitable way such as by keying and bolting down on to body of pump unit. The blocks are positioned on opposite sides of central metal block 128, and bolts 130 secure the blocks together against displacement. The blocks are so assembled that the chambers of the two sets of pumping devices are in line with one another on opposite sides of the central block 128.

Between each oppositely disposed pair of chambers 124 and 126, the central block is drilled to form passages for conducting filler material to and away from the pump chambers. As shown in Fig. 3, a passage 132 extends from the top middle portion of the central block and opens out through the side of the block into each pump chambers. Similarly a second passage 134 extends from the top of the block downwardly and thence out through the side of the block to open into each pump chamber. Passage 132 is referred to as the pump admission passage or conduit; passage 134 as the discharge passage or conduit.

Movable along the top of the central block 128 is a slide valve member 136. The valve member is shaped in a novel manner to control all the passages leading to and from the chambers of both sets of pumping devices in such a way that the admission passages of one set and the discharge passages of another set open and close together, while in reverse order the admission passages of the second set and the discharge passages of the first set are opened and closed together. The slide valve is operated in timed relation to the strokes of the pistons so that the admission passages of one set of pumping devices are open when the pistons are retracting while at the same time the discharge passages of the other set are open to receive the filler material expelled from the pump chambers of this set.

Refering to Fig. 3, the slide valve is provided with passages 133 and 135 which open on the top and bottom sides thereof. As the slide valve shifts back and forth the passages 133 either align with passages 132 and form extensions thereof or are displaced to one side so that the body of the valve cuts off the passage of the fluid and the passages 135 either align with discharge passages 134 and form extensions thereof or are displaced to one side so that the valve body cuts off the passage of fluid. In the position illustrated in Fig. 3, the admission passage 132 leading to chamber 126 is opened through the valve member to the top side thereof while the corresponding admission passage to chamber 124 is cut off. Similarly, the discharge passage 134 leading from chamber 124 is open while the corresponding discharge passage for chamber 126 is cut off. The control exercised by the slide valve over the passages illustrated in Fig. 3 is also true of the passages leading to the remaining chambers in the two sets of pumping devices. The position of the valve member in Fig. 3 is at one end of its movement. When shifted to the opposite end of its movement the open and closed conditions of the passages are reversed.

As previously mentioned, the slide valve is operated in timed relation to the functioning of the pump pistons. At the completion of the forward and rearward strokes of the pistons the slide valve moves from one of its control positions to the other. This is accomplished by a novel cam drive receiving impetus from the crank which drives the pistons. Referring to Fig. 4, the crank shaft carries on its rear end a pinion 138 meshing with a pinion 140. This is fixed to the cam member 74 previously described which is provided with a cam slot 142 in the periphery thereof. Projecting into the cam slot is a stud 144 fixed to the rear end of the slide valve. To reduce friction, the stud carries a freely rotatable ring 146 which rides against the side walls of the cam slot. It is obvious that as the slotted member 74 rotates it will slide the valve member back and forth. The cam slot is so formed and related to the position of the crank that the slide valve moves from one position to the other while the pistons on the frames are resting after completion of their forward and rearward strokes.

Above the slide valve 136 is a metal block 148. This block is secured by bolts 150 which pass by on opposite sides of the slide valve and enter the central block 128 as shown in Fig. 3. The bolts also pass through spacer elements 152—152 on opposite sides of the slide valve which carry the weight of the structure thereabove and also form a guide for holding the slide valve to straight line movement. Block 148 is cored out to form a longitudinal passage 154 just over the slide valve as Fig. 4 indicates. Vertical openings 156 are provided at spaced intervals establishing communication between the passage 154 and the top of the block 148. Superimposing the block is a flat plate 158 also secured to the assembly by the bolts 150. This plate is provided with passages 160 aligning with the opening 156.

As previously described, the vat 28 for containing the capsule filler content material is attached to the top of the pump unit 22. The flat plate 158 forms a part of the support for the vat serving as a base therefor. Openings are provided in the bottom of the vat through which filler content material can flow from the vat into the passages 160 and thence into the openings 156 of the block 148. It is obvious that in operation the filler content material will flow downwardly from the vat and be delivered to the pump chambers. The retracting movements of the pump pistons will, in addition to the force of gravity, create a suction drawing the filler material from the tank into the pump chambers.

The block 148 is provided with passages 162 opening out on the top side of the slide valve 136 in alignment with the discharge passages 134. The flat plate 158 is provided with passages 164 opening into communication with passages 162. Passages 164 turn and open out through the side of the plate member. The plurality of tubes 24 extend from the opposite sides of the plate 158 and the end of each tube is fitted to the outside opening of each passage 164. As previously described, the tubes 24 lead to the feeder head 26.

Formed integrally with the front of the pump unit 22 are two brackets 168 (Fig. 7) each having a pair of vertically spaced apertured ears 170 forming journal supports for a vertical hinge pin 172. Swinging on each hinge pin is a forwardly extending and downwardly bent arm 174. Integrally formed on the forward extremities of arms are sleeves 176 in each of which a pin 178 is slidable. The pins 178 carry on their lower ends a flat plate 180 which forms part of the feeder head. This plate is fixed to the top of the converging side wall portion of the feeder head 26 in any suitable way. The feeder tubes 24 leading from the pump unit extend perpendicularly downwardly toward the plate 180 and are fitted thereinto in any suitable way. The feeder head is provided with passages extending as continuations of the tubes 24 and opening out through the apex of the head. The construction of the feeder head and its relationship to the die rolls is described and claimed in my co-pending application, Serial No. 307,666, filed Dec. 5, 1939.

The arms 174 connect the feeder head to the pump unit 22. The form of connection, however, is such that the feeder head is permitted a limited movement in all directions except longitudinally. The slidable fit of the pins 178 in the sleeves 176 allows the head to rise and fall. The swinging movement of the arms 174 on the hinge pins 172 allows the feeder head to shift left and right. This freedom of movement allows the feeder head to adjust itself to irregularities in the operation of the die rolls and form an air tight seal between the surfaces of the die rolls and the concave sides of the feeder head. The connection provided by the arms 174 between the pump unit and the feeder head enables a novel operation to be performed, namely, to bodily lift the feeder head from between the die rolls at the time the pump unit is raised relative to the machine. This allows the operator to inspect the feeder head, and to change or clean the feeder head with convenience. Moreover, as will be described below, the feeder head and pump unit can be raised without disturbing the operation of all the other functions.

The pump unit 22 is mounted upon the upper ends of two supporting rods 182—182 (Figs. 3 and 4) which extend vertically downward into the die roll unit 18. Each of the rods 182 is racked with teeth 184. In engagement with the rack 184 are the pinions 186 fixed to a horizontal shaft 188 which projects out through one side of the unit 18. On the projecting end of the shaft is a handle 190. Normally the pump unit 22 rests upon the top of the die roll unit 18. When the handle 190 is swung in one direction, the pinions 186 on the shaft 188 is rotated and causes the rods 182 which they engage to rise and lift the pump unit. After the pump unit has been raised a certain distance, the sleeves 176 on the arms 174 connected to the feeder head abut the heads of the pins 178 and cause the feeder head to rise with the pump unit. Dotted lines in Fig. 4 represent two positions of the handle 190. The lower position is that assumed by the handle when the pump units 22 rests upon the die roll unit 18. The upper dotted representation of the handle corresponds to the raised position of the pump unit in Fig. 4. The unit can be raised to a height considerably above that illustrated in Fig. 4.

As previously mentioned it is possible to raise and lower the pump unit and the feeder head without stopping the operation of the moving parts of the machine. This is accomplished by slidably keying the gear change mechanism generally indicated at 64 to the drive shaft 66 of the pump unit. The shaft 66 is provided with flat portions 192. A gear wheel 194 of the speed change mechanism is shaped to fit the flattened section of shaft 66 and is keyed thereto. As a result, shaft 66 may be slidingly drawn through the gear wheel 194 ans the pump unit is raised. Nevertheless, so long as the shaft extends through the gear wheel a driving relationship is maintained between the two elements. Gear wheel 194 is driven from gear wheel 196 fixed to the top of the drive shaft 62 in the die roll unit. When the pump unit is raised sufficiently it is possible to reach under and change the gear mechanism in any suitable way such as by substituting a different gear wheel for the gear wheel 196. Such a change will alter the drive relationship between the pump unit 22 and the die roll unit 18. Raising the pump unit 22 therefore not only lifts the feeder head from between the die rolls but also permits access to the interior of the machine to change the speed change gear mechanism therein.

When the feeder head 26 is raised with the pump unit during the functioning of the machine, it is desirable to cut off the delivery of capsule filler material through the tubes 24 to the feeder head, otherwise the dosages will continue to be ejected from the discharge openings along the apex of the feeder had. This is accomplished in a novel manner by the provision of control valves and associated structure which are capable of by-passing the filler material back to the inlet side of the pumping devices. Referring to Figs. 1 and 3, the block 148 contains two drilled openings each extending from the front of the machine rearwardly through a set of delivery passages 162. In each drilled opening is a rotary valve member 200. Each valve member is provided with a series of diametric passages 202 which in the position shown in Fig. 3 align themselves with the discharge passages 162.

Each valve member is provided with a series of notches 204. Opposite each notch is a short horizontal passage 206 which opens into the larger vertical passages 156 extending between the vat 28 and the passages 132 leading to the inlets of the pumping devices. The notches 204 on each valve member 200 are of such a length that the valve can be utrned to open communication between the transverse passages 206 and the discharge passages 162. At the same time the diametrically extending passages 202 are turned out of line with the passages 162 cutting off further delivery of content material to the tubes 24. The result is that the pumps continue to operate but ineffectively since the dosages discharged from the pump chambers are by-passed back into the inlet passages leading to the chambers. To effect turning movement of the valves a handle shown at 208 in Fig. 2 is detachably connected to the exposed ends of the valve members. Thus at any time the discharge of content material from the feeder head can be cut off without stopping the operation of the machine.

In many instances the filler content material for the capsules is highly mobile and if no provision is provided for preventing it, the substance will leak through between the moving surfaces of the machine, particularly along the cylinder walls in which the pistons 112 and 114 operate. This leakage will not only alter the intended dosage for the capsules but also in many cases foul the moving parts of the machine causing them to deteriorate at a faster rate. Moreover, if the content material is inflammable, leakage of this character increases the fire hazard. A novel provision is made for preventing leakage of filler material from the pumping devices. This is accomplished by providing an oil seal along the cylinder walls around the pistons which is maintained at a pressure slightly greater than the pressure exerted by the pistons on the filler content material to discharge this material from the pumping devices. As a result the oil seal counteracts any tendency of the content material to leak out of the pressure chambers past the pistons. The oil used is of innocuous character so that if any trace flows into the pressure chambers it will not effect the dosage capsulated.

To provide the oil seal and maintain it at the desired pressure, the blocks 120 and 122 are each provided with a passage 210 which extend transversely to the chambers 124 and 126 and open out into the bores in which the sleeves forming the chambers are fitted. Ports 212 open communication between the passages 210 and the chambers 124 and 126. The passages and ports are so arranged that the oil is delivered to the annular groove of the cylinder wall at a location never uncovered by the face of the piston. Oil is delivered to the passages 210 by tubes 214 communicating with a source of oil under pressure which is not shown. Fittings 216 on the ends of the delivery tubes connect the tubes with the passage 210 in a leak-proof manner.

What I claim is:

1. In a capsulating machine, a metering device for discharging regulated amounts of capsule filler content material between sheets of capsule shell forming material comprising, in combination, a pair of pumping devices each including a pump chamber and a pump plunger therein, a support for each plunger, means for connecting said supports together, means acting upon said connection for jointly reciprocating said plungers and means for adjusting said connection to vary the distance between said supports and thus vary the stroke of the plungers in their respective chambers.

2. In a machine for capsulating fluid filled sealed capsules, means for feeding filler content material to each capsule shell as it is formed comprising a pair of opposed pump devices each including a chamber and a plunger reciprocable therein and a pair of ports one for admitting filler material and the other for discharging filler material, a revolvable crank member, a pair of yoke-shaped members straddling said crank member at an intermediate portion of their length and having their opposite ends each connected to a plunger of said pump devices, said crank alternately abutting said yoke-shaped members as it rotates and reciprocating the same and the plungers, means connecting the two yoke-shaped members together for joint reciprocation, said last means being adjustable to vary the spacing of the yoke-shaped members and thereby vary the length of stroke of the plungers in their respective chambers.

3. In a machine for capsulating fluid filled sealed capsules, pumping mechanism for delivering variable quantities of filler content material to the capsules being formed including a revolving crank, a pair of yoke-formed members straddling the crank at an intermediate portion of their lengths, each of said members carrying at least one pump plunger on its outer extremity, a pump chamber receiving each pump plunger having means for admitting filler material and means for discharging the same therefrom, means connecting said yoke-formed members together, said crank acting when revolved to reciprocate the yoke-formed members and the plungers carried thereby, and means for adjusting the spacing of said yoke-formed members relative to one another to vary the length of the stroke of the plungers.

4. In a machine for capsulating fluid filled sealed capsules, pumping mechanism for delivering variable quantities of capsule filler material to the capsules being formed comprising a pair of pumping devices each including a pump chamber and a plunger reciprocating therein, a revolving crank, a pair of yoke frames straddling said crank, each yoke frame having an outer transverse section on one side of said crank having engagement with one of the plungers and an inner transverse section on the other side of the crank with which the crank engages in its revolution and parallel side sections connecting the end sections together, means mounting each plunger on the outer end section of a frame, means mounting said frames for reciprocating movement along a path perpendicular to the axis of revolution of the crank, means adjustably connecting the said frames together for joint reciprocating movement, a manual control for adjusting said last means to vary the extent of separation of the frames with respect to one another and thereby vary the stroke of the plungers.

5. In a machine for capsulating fluid filled sealed capsules, pumping mechanism for delivering variable quantities of capsule filler material to the capsules being formed comprising a pair of pumping devices mounted in line and each including a pump chamber and a plunger reciprocable therein, a revolving crank, a pair of yoke frames straddling said crank and mounted for reciprocating movement in a path perpendicular to the axis of revolution of said crank, each yoke frame composed of spaced parallel side sections extending past said crank and transverse sections on either side of said crank connecting the side sections together, said crank in its revolution adapted to alternately strike one of said transverse sections of each yoke frame and cause the same to be moved in its path of movement, means connecting each yoke frame to a plunger for joint movement together, a threaded member extending in the line of movement of said yoke frames and connecting the two frames together for joint movement, said member adapted on threaded adjustment to vary the extent of separation of one yoke frame with respect to one another and thereby vary the stroke of the plungers.

6. In a capsulating machine, a pair of pumping devices, each device including a plurality of pumping chambers, a plunger in each chamber, means connecting the several plungers of each device together as a set for unitary operation, plunger operating mechanism including means coupling said two sets of plungers together for joint operation to advance the plungers of one set on their exhaust strokes while withdrawing the plungers of the other set on their intake strokes, and an adjustment acting on said coupling means to vary the strokes of the several plungers.

7. In a machine of the character described, a pair of oppositely disposed pumping devices, each device having a battery of aligned pump chambers, a piston reciprocable within each chamber, plunger operating mechanism including means connecting the several plungers in each device together for joint operation and means connecting the several plungers of one device to the several plungers of the other device for unitary operation to project the several plungers of one device on their exhaust strokes while withdrawing the several plungers of the other device on their intake strokes, said operating mechanism provided with an adjustment operable to adjust the relative position of the several plungers of the two devices to vary the length of their strokes to the same extent.

8. In a machine of the character described, a pair of oppositely disposed pumping devices, each device having a battery of aligned pump chambers and provided with a plunger reciprocable within each chamber, plunger operating mechanism connecting the several plungers of each device together for joint operation and connecting the several plungers in one device to the several plungers in the other device for operation to project the plungers of one device on their exhaust strokes while withdrawing the plungers of the other device on their intake strokes, said mechanism provided with an adjustment operable to vary the length of the strokes of the several plungers as a unit and to the same extent by resetting the limit of the intake stroke position of each plunger without varying the limit of the exhaust stroke position.

9. In a machine of the character described, in combination, a pair of oppositely disposed pumping devices, each device including a battery of aligned pump chambers, each chamber provided with an intake and an exhaust, a plunger reciprocable within each chamber, a pair of telescoping yoke frames supported for reciprocating telescoping movement, means coupling the several plungers of one pump device with one yoke frame to reciprocate therewith, means coupling the several plungers of the other pump device with the other yoke frame to reciprocate therewith, an abutment carried by each yoke frame, pump driving means having a part interposed between said abutments operable to engage said abutments and reciprocate the yoke frames, and means operable to adjust the spacing of said abutments relative to each other to vary the stroke of the pump plungers.

10. In a machine of the character described, in combination, a pair of oppositely disposed pumping devices, each device including a battery of aligned pump chambers, a block interposed between said two devices and having an exhaust passageway and an intake passageway leading from each pump chamber through the block and opening out on the top face of the block, an apertured valve plate slidable across the top face of the block and controlling the flow of fluid through the passageways from the several pump chambers, driving means connected with the several plungers of the two devices operable to reciprocate said plungers, and a driving connection between said driving means and said valve plate to reciprocate the valve plate in synchronism with the reciprocation of the pump plungers.

ROBERT P. SCHERER.